3,206,461
1-ACYL-1-[2-(AZACYCLYL)ETHYL]-2-(5-NITRO-FURFURYLIDENE)HYDRAZINES

Frank F. Ebetino and Gabriel Gever, Norwich, N.Y., assignors to The Norwich Pharmacal Company, a corporation of New York
No Drawing. Filed Apr. 5, 1962, Ser. No. 185,243
9 Claims. (Cl. 260—240)

This invention relates to novel chemical compounds. More particularly this invention relates to a series of 1-acyl-1-[2-(azacyclyl)ethyl] - 2 - (5 - nitrofurfurylidene) hydrazines represented by the formula:

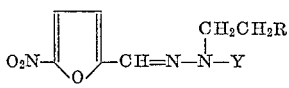

wherein
R represents a heterocycle selected from the group consisting of 2-pyridyl; 4-pyridyl; 4-morpholinyl, 1-piperidyl, and 4-(2-hydroxyethyl)piperazinyl; and
Y represents an acyl group selected from acetyl and carbamyl; their pharmaceutically acceptable salts; methods for the preparation thereof and intermediates useful in their preparation.

These compounds are parasiticides and are useful in combatting bacteria, helminths, and protozoa. Their parasiticidal potency is not limited to in vitro demonstrations for they are systemically effective in combatting infections caused by a wide variety of pathogens such as *Staphylococcus aureus, Streptococcus pyogenes, Erysipelothrix rhusiopathiae, Eimeria tenella, Trichomonas foetus, Syphacia obvelata,* and *Ascaridia galli* in well tolerated dosages conforming to regimens commonly employed.

These new compounds can be produced in a number of ways. The manner of producing a particular member is dictated largely by the facility of obtaining the required reactants and a consideration of the reactivity thereof to insure optimum yield of end product. The following schemata depict routes which may be followed to obtain these compounds:

(1) By cyanating the appropriate azacyclylethyl hydrazine in an aqueous medium and thereafter adding 5-nitro-2-furaldehyde or functional derivative thereof capable of yielding it under the reaction conditions according to this equation:

$$ANHNH_2 + MCNO + NF$$

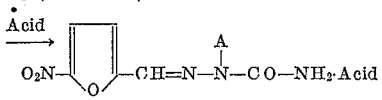

wherein A represents azacyclylethyl; M represents sodium or potassium; NF represents 5-nitro-2-furaldehyde or reactive derivative hydrolyzable thereto and the "acid" is a mineral acid, preferably hydrochloric.

In accordance with this scheme the hydrazine is dissolved in water at a pH of about 7 in the presence of hydrochloric acid and potassium cyanate added thereto. The pH is lowered to about 3 with additional hydrochloric acid and the NF dissolved in an appropriate solvent such as ethanol is added. The reaction is suitably conducted at about ambient temperature. The product obtained in this fashion is in the form of a salt from which the base may be generated by treatment with a base such as ammonium hydroxide.

(2) By acylating a hydrazone according to this equation:

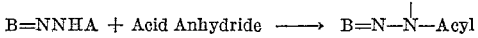

wherein B is a group such as nitrofurfurylidene, benzylidene, or isopropylidene; the "acid anhydride" is, for instance, acetic anhydride; A has the significance given in (1); and "Acyl" is the group derived from the "acid anhydride," for instance acetyl. In this route when B is other than nitrofurfurylidene it is necessary to react such product in a hydrolyzing medium with 5-nitro-2-furaldehyde or functional derivative thereof to effect exchange for the nitrofurfurylidene group.

In accordance with this scheme the hydrazone is reacted with the acid anhydride preferably under the influence of heat until reaction is considered complete. It is not necessary to employ a solvent in this reaction for an excess of anhydride will serve the purpose. The reaction mixture is cooled and the product recovered in conventional fashion. The product obtained can be converted to a salt by treatment with an acid; for instance, by adding concentrated hydrochloric acid to an isopropanol solution of it. Compounds particularly useful in this scheme are 5-nitro-2-furaldehyde 2-(2-pyridyl) or (4-pyridyl)ethyl hydrazone.

(3) By reacting an alkylidene 2-haloethyl semicarbazone with the appropriate heterocycle according to this equation:

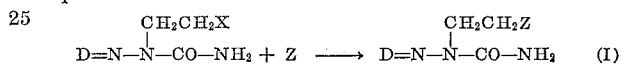

wherein D is an alkylidene group such as benzylidene or isopropylidene; X is a halogen atom, preferably chlorine; and Z is a heterocycle such as morpholine, piperidyl or piperazinyl and thereafter bringing together (I) and 5-nitro-2-furaldehyde or a reactive derivative thereof hydrolyzable thereto in the presence of an acid, preferably under the influence of heat in an inert reaction medium.

In accordance with this scheme the semicarbazone; for instance, benzaldehyde 2-(2-chloroethyl) semicarbazone, conveniently produced by heating 3-benzylideneamino-2-iminooxazolidine hydrochloride in a hydrocarbon solvent such as xylene, is treated with Z in a solvent such as benzene at elevated temperature until the reaction is considered complete. The reaction mixture is filtered and the desired product recovered from the filtrate in conventional fashion. It is converted to the nitrofurfurylidene derivative as aforesaid.

These compounds are readily formulated in accordance with pharmaceutical practice for administration in the form of capsules, suspensions, tablets, troches and the like using excipients and adjuvants well known in the art with which no incompatibility exists, In poultry application they may also be combined in the diet for convenient administration.

The members of this series vary somewhat one from the other in respect to systemic activity. The member which is now preferred and whose activity exemplifies the wide variety of susceptible pathogens is 5-nitro-2-furaldehyde 2 - [2-(4-morpholinyl)ethyl] semicarbazone hydrochloride: Administered perorally in a single dose of 210 mg./kg. to mice one-half hour post lethal inoculation of *Staphylococcus aureus,* 100% protection is secured; administered perorally in a single dose of 120 mg./kg. to mice six hours post lethal infection with *Erysipelothrix rhusiopathiae,* 60% protection is obtained; administered perorally in a dosage regimen of 300 mg./kg. b.i.d. for four days to mice harboring *Syphacia obvelata,* reduction and elimination of the pinworm infestation is promoted; and administered in their feed supply at a level of 0.011% by weight to chickens infected with *Eimeria tenella,* morbidity and mortality due to cecal coccidiosis are checked.

In order that this invention may be readily available

EXAMPLE I

*5-nitro-2-furaldehyde 2-[2-(2-pyridyl)ethyl]semicarbazone hydrochloride*

A solution of 25 grams of 2-(2-pyridyl)ethylhydrazine in 200 cc. of water is adjusted to pH 7 with about 9 cc. of concentrated hydrochloric acid and 13 grams of potassium cyanate added. The solution is held at about 15–20° C., while 34 cc. of concentrated hydrochloric acid are added dropwise (pH 3). A solution of 25 grams of 5-nitro-2-furaldehyde in 100 cc. of ethanol is added dropwise with stirring. After a short time, a precipitate appears. The mixture is filtered to yield 46 grams of 5-nitro-2-furaldehyde 2-[2-(2-pyridyl)ethyl]semicarbazone hydrochloride. From the filtrate are obtained 7.3 grams of the free base by making it alkaline with ammonium hydroxide.

The product may be recrystallized from water.
Analysis:

|      | C     | H    | N     | Cl    |
|------|-------|------|-------|-------|
| Calc | 45.95 | 4.16 | 20.62 | 10.45 |
| Fd   | 46.30 | 4.06 | 20.60 | 10.44 |

EXAMPLE II

*5-nitro-2-furaldehyde 2-[2-(4-pyridyl)ethyl]semicarbazone hydrochloride*

To a solution of 57.4 grams of 2-(4-pyridyl)-ethylhydrazine in 1000 cc. of water are added 17 cc. of concentrated hydrochloric acid (pH 7). Forty grams of potassium cyanate are added and 80 cc. of concentrated hydrochloric acid slowly added with vigorous stirring (the temperature kept at 15–20° C.) until the pH is 2.6. A solution of 75 grams of 5-nitro-2-furaldehyde in 150 cc. of isopropanol is then added dropwise with stirring. The resulting solution is clarified and the filtrate extracted with 3–250 cc. portions of ether. The aqueous layer is made alkaline with ammonium hydroxide (enough water is added to make a total volume of 3000 cc.) and the mixture filtered. The precipitate is washed with isopropanol and ether and recrystallized from 600 cc. of dimethylformamide to yield 67.5 grams, 53% of 5-nitro-2-furaldehyde 2-[2-(4-pyridyl)ethyl]semicarbazone, M.P. 234–5° C.

The product is suspended in 100 cc. of isopropanol, 50 cc. of concentrated hydrochloric acid added, and the suspension heated to boiling. Water (300 cc.) is added, the hot solution clarified and the filtrate cooled to yield 66.5 grams M.P. 240–245° C.

The salt may be converted to the base by adding ammonium hydroxide to its aqueous solution.
Analysis:

|      | C     | H    | N     | Cl    |
|------|-------|------|-------|-------|
| Calc | 45.95 | 4.16 | 20.62 | 10.45 |
| Fd   | 46.25 | 4.11 | 20.63 | 10.37 |

EXAMPLE III

*1-acetyl-1-[2-(2-pyridyl)ethyl]-2-(5-nitrofurfurylidene) hydrazine hydrochloride*

A. *5-nitro-2-furaldehyde 2-(2-pyridyl)ethylhydrazone hydrochloride.*—27.4 g. (0.2 mole) of 2-(2-pyridyl)ethylhydrazine is dissolved in 100 ml. of 60% ethanol, acidified to pH 6 with concentrated HCl and then poured into a solution of 32.2 g. (0.235 mole) of 5-nitro-2-furaldehyde (85%) in 100 ml. of 60% ethanol. The mixture is stirred for 10 minutes and then cooled in the refrigerator. The red solid is filtered off and rinsed with ethanol. The yield is 48 g. (81%, M.P. 144–6° C. By concentrating the filtrate a second crop may be obtained to give a total yield of 95%.

The product may be recrystallized from a mixture of 200 ml. of isopropanol and 175 ml. of ethanol to give 25.5 g., M.P. 148.5–151° C.
Analysis:

|      | C     | H    | Cl    |
|------|-------|------|-------|
| Calc | 48.55 | 4.42 | 11.95 |
| Fd   | 48.28 | 4.18 | 11.88 |

B. 47 g. (0.18 mole) of A above is added to 140 ml. of acetic anhydride and the mixture heated at the boiling point for 3 minutes to completely dissolve the solid. The yellow solid that precipitates on cooling in the refrigerator is filtered off and slurried in water (added NH₄OH to give pH 9). After filtering and drying, the solid weighs 51 g. (93.5%), M.P. 135–6° C. The free base may be dissolved in 1 l. of hot isopropanol and treated while still hot with 20 ml. of concentrated hydrochloric acid to precipitate the salt, 1-acetyl-1-[2-(2-pyridyl)ethyl]-2-(5-nitrofurfurylidene)hydrazine hydrochloride.
Analysis:

|      | C     | H    | Cl    |
|------|-------|------|-------|
| Calc | 49.64 | 4.46 | 10.46 |
| Fd   | 49.85 | 4.31 | 10.17 |

EXAMPLE IV

*5-nitro-2-furaldehyde 2-[2-(4-morpholinyl)ethyl] semicarbazone hydrochloride*

A. *3-benzylideneamino-2-iminooxazolidine hydrochloride.*—175 g. (0.84 mole) of benzaldehyde 2-(2-hydroxyethyl)semicarbazone in 560 ml. of benzene is treated gradually with 236 ml. (396 g.) (3.3 moles) of thionyl chloride in 400 ml. of benzene. After the exothermic reaction has subsided the mixture is heated with stirring at 60–65° C. for 3½ hrs. After cooling, the solid is filtered, washed with benzene and dried at 60° C. The yield is 183 g. (97%), M.P. 160–5° C.

B. *Benzaldehyde 2-(2-chloroethyl)semicarbazone.*—175 g. (0.775 mole) of the iminooxazolidine suspended in 1 l. of dry xylene is heated at reflux with stirring for 20 mins., cooled to 70° C. and filtered from a small amount of brown solid. The filtrate on further cooling deposits a light tan solid which is removed by filtration and dried at 60° C. The yield is 140 g. (80%), M.P. 125–127° C.

C. *Benzaldehyde 2-[2-(4-morpholinyl)ethyl]semicarbazone.*—50 g. (0.221 mole) of the chloroethyl compound in 150 ml. of benzene (redistilled) is treated with 38.6 g. (0.442 mole) of morpholine and heated to reflux on the steam bath. At the reflux temperature practically all of the starting material dissolves and then morpholine hydrochloride separates. The mixture is refluxed for 35 mins., filtered hot from the hydrochloride, 25 g. (91.7%), M.P. 172–5° C., and the filtrate cooled to give the white solid product, benzaldehyde 2-[2-(4-morpholinyl)ethyl]semicarbazone the yield is 40.5 g. (66.4%), M.P. 135–140° C.

D. 40 g. (0.145 mole) of the morpholinyl compound of C is added to a mixture of 100 ml. of water and 35 ml. of conc. hydrochloric acid and then steam distilled to remove the benzaldehyde. 20.4 g. (0.145 mole) of 5-nitro-2-furaldehyde in 50 ml. of ethanol is added to the hot solution and heated a few minutes. The mixture is allowed to cool overnight filtered from a small amount of white solid, extracted with ether and then treated with ammonium hydroxide solution to precipitate an orange solid, 30.6 g. (68%), M.P. 185–195° C. The crude solid was recrystallized from 500 ml. of acetonitrile+charcoal to give yellow needles of 5-nitro-2-furaldehyde 2-[2-(4- morpholinyl)ethyl]semicarbazone. The filtrate when cooled in the refrigerator gave a second crop which had a lower M.P. Recrystallization of the second crop from acetonitrile gives a total yield of pure free base of 22 g. (50%), M.P. 205–6° C. The free base was dissolved in a hot mixture of 800 ml. of isopropanol and 200 ml. of nitromethane and treated while still hot with 10 ml. of conc. HCl to ppt. the hydrochloride, 5-nitro-2-furaldehyde 2-[2 - (4 - morpholinyl)ethyl]semicarbazone hydrochloride. The yield is 25 g. (30%), M.P. 250–1° C.

In place of 5-nitro-2-furaldehyde suitable reactive derivatives thereof that may be employed are 5-nitro-2-furaldoxime and 5-nitro-2-furaldehyde diacetate.

Analysis:

|   | C | H | Cl |
|---|---|---|---|
| Calc | 41.44 | 5.21 | 10.20 |
| Fd | 41.25 | 5.13 | 10.16 |

EXAMPLE V

*5-nitro-2-furaldehyde 2-[2-(1-piperidyl)ethyl] semicarbazone*

A. 70 g. (0.31 mole) of benzaldehyde 2-(2-chloroethyl) semicarbazone (see Ex. IV; B) and 32.5 g. (0.62 mole) of piperidine in 210 ml. of dry benzene are heated at reflux for 15 mins. The mixture is cooled to room temperature and the piperidine·HCl filtered off (39.5 g., 103%). The filtrate is concentrated in vacuo (30–60° C.) to about ½ volume, and cooled to give a solid which is stirred with ether. The yield is 27.85 g. (32.8%), M.P. 120–130° C.

B. 25 g. (0.091 mole) of the benzal compd. in 100 ml. of 10% $H_2SO_4$ is steam distilled to remove the benzaldehyde and then treated while still hot with 12.9 g. (0.091 mole) of 5-nitro-2-furaldehyde diacetate in 25 ml. of ethanol. After cooling and extracting four times with ether, the red solution is treated with excess ammonium hydroxide solution to cause the separation of an orange gum which slowly crystallizes on cooling and scratching. The yield of 5-nitro - 2 - furaldehyde 2-[2-(1 - piperidyl) ethyl]semicarbazone is 25 g. (90%), M.P. 110–135° C. This solid is recrystallized from 100 ml. of butanol and charcoal to give the yellow base 18 g., M.P. 152–163° C. The base is then dissolved in 250 ml. of warm butanol and while still warm, treated with 6 ml. of conc. HCl. The 5-nitro-2-furaldehyde 2-[2-(1 - piperidyl)ethyl]semicarbazone hydrochloride is filtered off, rinsed with alcohol and dried at 110° C. The yield is 10.6 g. (62.5%), M.P. 250° C., dec.

Analysis:

|   | C | H | Cl |
|---|---|---|---|
| Calc | 45.20 | 5.83 | 10.26 |
| Fd | 45.52 | 5.75 | 10.26 |

EXAMPLE VI

*5 - nitro - 2 - furaldehyde 2-{2-[4-(2-hydroxyethyl)-1-piperazinyl]ethyl}semicarbazone dihydrochloride hydrate*

68 g. (0.3 mole) of benzaldehyde 2-(2-chloroethyl) semicarbazone (see Ex. IV; B) and 38.3 g. (0.45 mole of N-hydroxyethylpiperazine (96.8%) in 200 ml. of dry benzene are heated at reflux with occasional shaking for 35 mins. The hot benzene upper layer is decanted from the viscous oil, and cooled to give a white solid. The yield is 39.1 g. (40%), M.P. 137–140° C. This solid is added to 100 ml. of 10% HCl, warmed for a few minutes on the steam bath, filtered from an insoluble white solid (1.9 g.), and the filtrate treated with 27.6 g. (0.1135 mole) of 5-nitro-2-furaldehyde diacetate. The mixture is heated on the steam bath until all the 5-nitro-2-furaldehyde diacetate goes into solution, and then the cooled solution is extracted with ether and evaporated to dryness in vacuo on the steam bath. The solid is triturated with isopropanol to give 44 g. (87%), M.P. 205–210° C., dec. After recrystallization from 1320 ml. of isopropanol and 250 ml. $H_2O$ there are obtained 28.8 g., M.P. 208–210° C., dec., of yellow solid, 5-nitro-2-furaldehyde 2-{2-[4-(2-hydroxyethyl)-1-piperazinyl]ethyl}semicarbazone dihydrochloride hydrate.

Analysis:

|   | C | H | Cl |
|---|---|---|---|
| Calc | 37.75 | 5.88 | 15.92 |
| Fd | 37.89 | 5.53 | 15.89 |

EXAMPLE VII

*1 - acetyl - 2 - (5-nitrofurfurylidene)-1-[2-(4-pyridyl) ethyl]hydrazine hydrochloride hydrate*

A. *5-nitro-2-furaldehyde 2-(4-pyridyl)ethylhydrazone hydrochloride.*—13.7 g. (0.1 mole) of 2-(4-pyridyl)ethylhydrazine is dissolved in 50 ml. of 50% ethanol, brought to pH 6 with concentrated HCl, and then added all at once to a solution of 16.6 g. (0.1175 mole) of 5-nitro-2-furaldehyde (85%) in 35 ml. of ethanol and 25 ml. of water. A red solid separates after several minutes stirring. The mixture is allowed to stand at room temperature for 1 hour and then cooled in the refrigerator. The solid is filtered off giving 27.85 g. (94%), M.P. 178–180° C., dec. The solid is recrystallized from a mixture of 300 ml. of ethanol and 15 ml. of water. The yield of 5-nitro-2-furaldehyde 2-(4-pyridyl)ethyl-hydrazone hydrochloride hydrate is 23.4 g., M.P. 181–2° C., dec.

The salt may be converted to the base by basifying its aqueous solution.

B. 44.1 g. (0.17 mole) of free base of A is treated with 132 ml. of acetic anhydride (distilled) and heated with stirring to 110° C. All the solid dissolves and on cooling a yellow precipitate forms which is filtered off and then washed with water (made basic with $NH_4OH$). The yield is 33.6 g. (65%), M.P. 173–6° C. The solid was dissolved in 1250 ml. of hot ethanol with charcoal, cooled to 50° C. and treated with 12 ml. of conc. HCl. The yield is 32.15 g. M.P. 205–9° C.) of 1-acetyl-2-(5 - nitrofurfurylidene) - 1 - [2-(4-pyridyl)ethyl]hydrazine hydrochloride hydrate.

Analysis:

|   | C | H | Cl |
|---|---|---|---|
| Calc | 47.15 | 4.80 | 9.94 |
| Fd | 47.36 | 4.84 | 9.80 |

What is claimed is:

1. A compound selected from the group consisting of the bases of the following formula and their mineral acid salts:

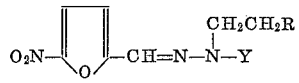

wherein

R represents a member of the group consisting or 2-pyridyl, 4-pyridyl, 4-morpholinyl, 1-piperidyl, and 4-(2-hydroxyethyl)piperazinyl; and Y represents a member of the group consisting of acetyl and carbamyl.

2. The compound 5-nitro-2-furaldehyde 2-[2-(2-pyridyl)ethyl]semicarbazone hydrochloride.

3. The compound 5-nitro-2-furaldehyde 2-[2-(4-pyridyl)ethyl]semicarbazone hydrochloride.

4. The compound 1-acetyl-1-[2-(2-pyridyl)ethyl]-2-(5-nitrofurfurylidene)hydrazine hydrochloride.

5. The compound 5-nitro-2-furaldehyde 2-[2-(4-morpholinyl)ethyl]semicarbazone hydrochloride.

6. The compound 1-acetyl-2-(5-nitrofurfurylidene)-1-[2-(4-pyridyl)ethyl]hydrazine hydrochloride hydrate.

7. A compound selected from the group consisting of the bases of the following formula and their mineral acid salts:

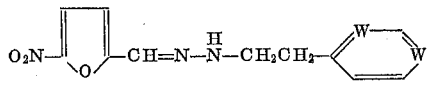

wherein one W represents methenyl, the other represents nitrogen.

8. The compound 5-nitro-2-furaldehyde 2-(2-pyridyl)ethylhydrazone hydrochloride.

9. The compound 5-nitro-2-furaldehyde 2-(4-pyridyl)ethylhydrazone hydrochloride.

References Cited by the Examiner

UNITED STATES PATENTS

| | | | |
|---|---|---|---|
| 2,663,710 | 12/53 | Hayes | 260—347.3 |
| 2,726,241 | 12/55 | Gever et al. | 260—240 |
| 2,802,002 | 8/57 | Gever | 260—240 |
| 3,012,032 | 12/61 | Gever et al. | 260—250 |
| 3,043,853 | 7/62 | Ebetino | 260—347.7 |
| 3,075,973 | 1/63 | Michels | 260—240 |

FOREIGN PATENTS 218,014  11/61  Austria.

WALTER A. MODANCE, *Primary Examiner.*

JOHN D. RANDOLPH, *Examiner.*